United States Patent [19]
Koch

[11] 4,428,325
[45] Jan. 31, 1984

[54] FEEDING BOWL AND LINER THEREFOR

[76] Inventor: Charlotte M. Koch, 28796 Roberts Rd., Shedd, Oreg. 97377

[21] Appl. No.: 383,035

[22] Filed: May 28, 1982

[51] Int. Cl.³ .............................................. A01K 5/01
[52] U.S. Cl. ...................................... 119/61; 220/408
[58] Field of Search .................. 119/61; 220/408, 410

[56] References Cited

U.S. PATENT DOCUMENTS

| | | | |
|---|---|---|---|
| 2,314,195 | 3/1943 | Burdick | 220/306 |
| 3,195,510 | 7/1965 | Bernstein | 119/61 |
| 3,352,449 | 11/1967 | Jackson | 119/61 |
| 3,527,192 | 9/1970 | Ferrara | 119/61 |
| 3,698,594 | 10/1972 | Boehlert | 119/61 X |
| 4,252,265 | 2/1981 | Brundige et al. | 220/306 X |

FOREIGN PATENT DOCUMENTS 1560488  2/1980  United Kingdom ............... 220/408

*Primary Examiner*—Robert P. Swiatek
*Attorney, Agent, or Firm*—Norman B. Rainer

[57] ABSTRACT

A pet feeder is provided comprised of a durable bowl-shaped holding receptacle having an upper rim and exterior sidewall, and a thin resilient integral liner contoured to secure close-fitting contact with the interior of the receptacle and to extend over the rim and downwardly onto the exterior sidewall. The receptacle is elongated, having short and long axes of symmetry, and its sidewall is provided with opposed vertical and horizontal recesses. The vertical recesses permit finger insertion to facilitate removal of the liner. The horizontal recesses, in conjunction with the elongated configuration of the receptacle, cause the liner to be positively seated upon the receptacle.

7 Claims, 5 Drawing Figures

FEEDING BOWL AND LINER THEREFOR

BACKGROUND OF THE INVENTION

This invention relates to an improved pet feeder which utilizes disposable plastic liners adapted to fit within a durable bowl-shaped holding receptacle.

Animal pets, particularly dogs and cats, are usually fed from a bowl-shaped container made of plastic or ceramic materials. Often the animal does not completely finish the food placed in the container. Unless the leftover food is immediately removed by washing, it tends to adhere to the surface of the container, decays, and becomes relatively difficult to remove by usual washing methods. The decayed leftover food can be of ill consequence to the pet, and can produce generally unsanitary conditions involving microbial or insect infestation.

It has been proposed that inexpensive, disposable liners for such pet feeding containers be used. Such prior proposed reusable holding receptacle and associated disposable liners are disclosed in U.S. Pat. Nos. 3,991,719; 3,653,362; 3,527,192; and 3,698,594.

Such earlier bowl and liner combinations have not however been completely satisfactory. Problems inherent in earlier designs include difficulties in seating and unseating the linear with respect to the bowl receptacle, high cost of manufacture of the liners, and difficulties in the packaging of said liners for commercial distribution.

It is accordingly an object of the present invention to provide a pet feeder comprising a durable bowl-shaped holding receptacle and a disposable liner fitted thereto in a manner whereby food placed within said liner will not contact said holding receptacle.

It is a further object of the present invention to provide a pet feeder of the aforesaid nature which facilitates the seating of said liner within said holding receptacle and the removal of said liner therefrom.

It is another object of this invention to provide a pet feeder of the aforesaid nature wherein the liners are of low cost and can be nested for ease of packaging for commercial distribution.

These objects and other objects and advantages of the invention will be apparent from the following description.

SUMMARY OF THE INVENTION

The above and other beneficial objects and advantages are accomplished in accordance with the present invention by an improved pet feeder which comprises (a) a durable bowl-shaped holding receptacle of monolithic construction having an upwardly concave open interior contoured to have a long axis of symmetry and a short axis of symmetry, said axes being in perpendicularly bisecting juxtaposition, an upper rim, a circumferential exterior sidewall having a plurality of substantially vertically oriented elongated recesses in symmetrically opposed disposition about said long axis and horizontally oriented elongated recesses in paired opposition about said long axis, and a substantially flat exterior base, and (b) a resilient integral liner of uniformly thin thickness contoured to secure close-fitting contact with the interior of said receptacle and to extend over said rim and downwardly in contact with said exterior sidewall, and having indented portions adapted to engage said horizontally oriented recesses.

The bowl-shaped receptacle is preferably fabricated of thermoplastic material by an injection molding operation. Suitable thermoplastics include polyethylene, polypropylene, polymers derived from combinations of styrene with butadiene and acrylonitrile, commonly referred to as ABS plastics, and other polymeric materials exhibiting good impact strength and durability.

The liner is preferably fabricated of thin sheet stock which is subjected to a forming operation under conditions of heat and vacuum, a process sometimes referred to as vacuum forming.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
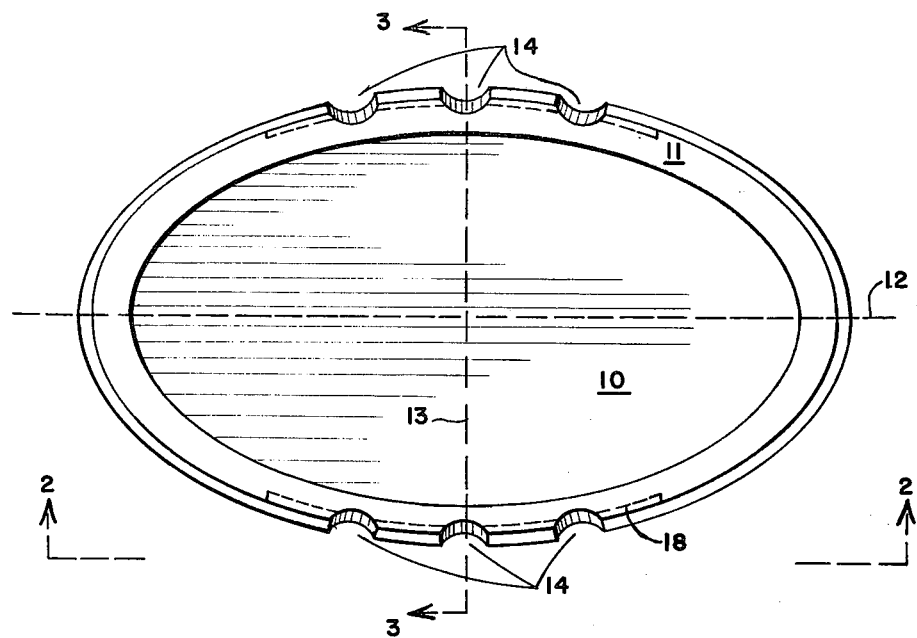
FIG. 1 is a top view of an embodiment of a bowl-shaped holding receptacle useful in the pet feeder of the present invention.
Figure 2:
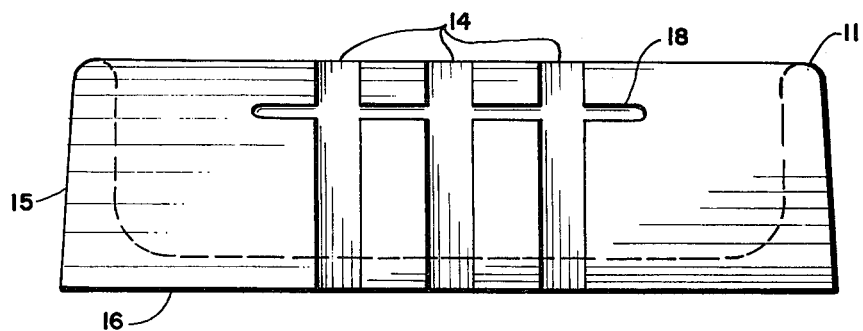
FIG. 2 is a side view taken in the direction 2—2 of FIG. 1.
Figure 3:
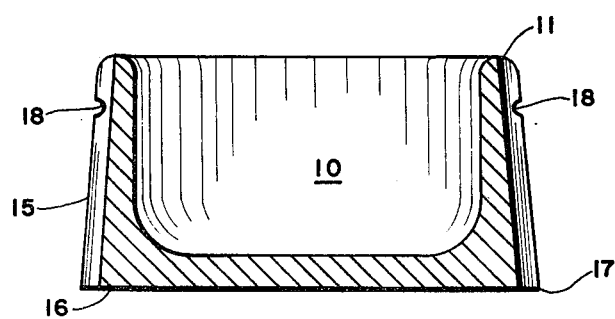
FIG. 3 is a sectional side view taken along the line 3—3 of FIG. 1.

Referring to FIGS. 1-3, a holding receptacle of the pet feeder of the present invention is shown as a monolithic structure which may be fabricated by a molding technique, supplemented, if necessary, by simple machining expedients such as milling or routing. The bowl-shaped interior 10 is upwardly concave. The periphery of the bowl-shaped interior, defined by rim 11, is of oval contour, having a long axis 12, and a short axis 13, said axes being in perpendicularly bisecting juxtaposition. The contour of interior 10 is symmetrical about axes 12 and 13.

Vertically oriented elongated recesses 14 are positioned in opposed disposition across long axis 12. Said elongated recesses 14 traverse the entire height of exterior sidewall 15, whereby their upper extremities enter upon rim 11, and their lower extremities enter upon flat base 16. In other embodiments however, said vertical recesses need not traverse the entire height of sidewall 15. The function of said vertical recesses is to permit fingers to enter between the holding receptacle and liner, as will hereafter be shown, and provide a passageway for the fingers in the lifting motion necesssary to remove the liner from the receptacle. Accordingly, one, two or three recesses 14 may be located on each side of long axis 12. The cross-sectional contour of recesses 14 is preferably semicircular, and their depth may range from about $\frac{1}{8}$" to $\frac{1}{2}$". In those embodiments of receptacle having more than one vertical recess 14 on each long side of the receptacle, the spacing between said recesses is preferably between about 1" and 2".

The perimeter 17 of base 16 preferably has the same general contour as the rim but of slightly greater dimensions, thereby providing stability toward possible toppling of the pet feeder. As a further design feature intended to thwart toppling, the height of the receptacle, measured as the vertical distance between the base and the rim, is preferably between about 40% and 60% of the diameter of the base along short axis 13. In those preferred embodiments wherein the perimeter of the base is larger than the perimeter of the rim, the sidewall will generally be angled toward the interior 10 in its ascent from the base. The sidewall is otherwise preferably of flat contour, whereby the receptacle, in its side sectional view, has a trapezoidal configuration such as shown in FIG. 2.

A pair of horizontally oriented elongated recesses 18 are symmetrically disposed about long axis 12, and intersect vertical recesses 14. The cross-sectional configuration of horizontal recesses 18 is preferably semicircular, having a diameter preferably smaller than the diameter of the cross section of vertical recesses 14. The depth of horizontal recesses 18 may range from about ⅛" to ½". Their length may range from about 1" to 4". The purpose of the horizontal recesses, as will hereinafter be shown, is to lock in place a liner placed over the receptacle.

Figure 4:
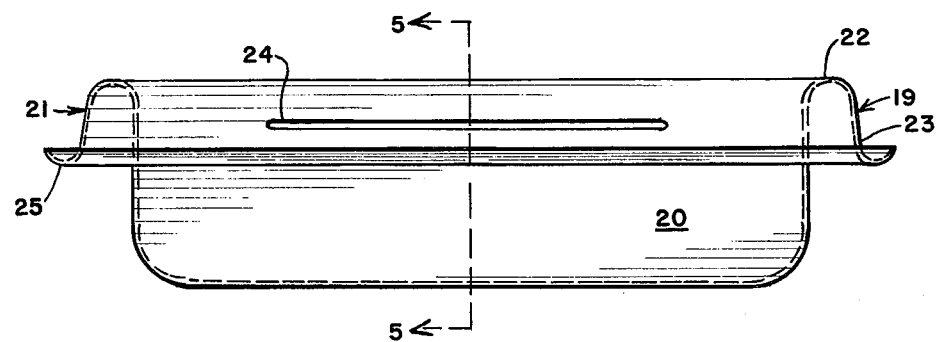
FIG. 4 is a side view of a liner adapted for use with the receptacle of FIGS. 1-3.
Figure 5:
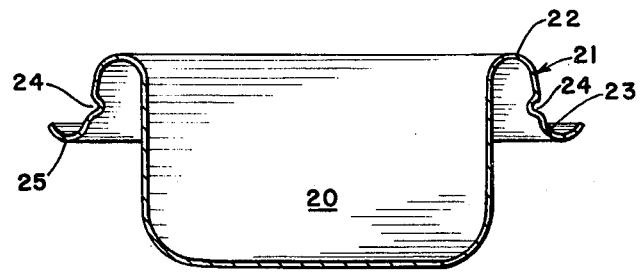
FIG. 5 is a sectional side view taken along the line 5—5 of FIG. 4.

The embodiment of liner 19 shown in FIGS. 4 and 5 is a monolithic structure fabricated preferably from thin, relatively rigid thin plastic sheet stock. Other methods of fabrication may however be utilized in its manufacture. The liner structure possesses resiliency by virtue of its thinness which may range from about 10 mils to 90 mils (0.090 inch). The plastic which may be utilized for fabrication of the liner include polystyrene and its copolymers which are amenable to thermoforming operations such as vacuum forming. It is important that the liner be impervious to liquids, reasonably strong, resilient, and of low cost.

The general shape of the liner includes a bowl portion 20 adapted to make close-fitting contact with the interior 10 of the holding receptacle. A lip member 21 surrounds the upper perimeter of the liner. The upper portion 22 of said lip member is contoured to make close-fitting contact with the rim 11 of the holding receptacle. The lower portion 23 of the lip member is adapted to make close-fitting contact with outer sidewall 15 of the receptacle. A pair of opposed locking tongues 24, formed as indented regions within lip member 21, are adapted in size, configuration and placement to fit within horizontal recesses 18 of the holding receptacle. The general design of the liner is such as to facilitate good nested storage of a multitude of such liners. An upturned trough 25 may be provided as a lowermost extremity of lip member 21 for the purpose of preventing spillage of food onto the underlying receptacle.

In operation, a liner is placed into a holding receptacle merely by aligning the long axes of the liner and receptacle, and pressing downwardly on the liner to facilitate engagement of the horizontal recesses by locking tongues 24. Because of the oblong shape of receptacle and liner, the alignment of the two members is substantially automatic insofar as bringing the locking tongues into engagement with the horizontal receptacles. If, for example, the receptacle and liner were of round configuration, proper alignment of tongues and recesses would not be as easily achieved.

Once locked in position, the liner cannot be easily dislodged by the pet. It is also to be noted that the lip member of the liner protects the holding receptacle from spilled food. The liner is removed by grasping the lip member across both sides of the long axis and flexing the liner outwardly, away from the holding receptacle. Such motion causes release of the locking tongues from the horizontal recesses. Vertical recesses enable the fingers to reach under the lip member to perform said flexing action, and also facilitate the upward motion necessary to lift the liner away from the holding receptacle.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An improved pet feeder comprising:
   (a) a durable bowl-shaped holding receptacle of monolithic construction having an upwardly concave open interior contoured to have a long axis of symmetry and a short axis of symmetry, said axes being in perpendicularly bisecting juxtaposition, an upper rim, a circumferential exterior sidewall having a plurality of substantially vertically oriented elongated recesses in symmetrically opposed disposition about said long axis, and horizontally oriented elongated recesses in paired opposition about said long axis, and a substantially flat exterior base, and
   (b) a resilient liner of uniformly thin construction contoured to secure close-fitting contact with the interior of said receptacle and extend over said rim and downwardly in contact with said exterior sidewall, and having indented portions adapted to engage said horizontally oriented recesses.

2. The pet feeder of claim 1 wherein the horizontally oriented elongated recesses in said receptacle intersect said vertically oriented elongated recesses.

3. The pet feeder of claim 1 wherein the height of the receptacle, measured as the vertical distance between said base and said rim, is between about 40% and 60% of the diameter of the base along said short axis.

4. The pet feeder of claim 1 wherein said sidewall is of flat contour and angled toward said interior in its ascent from said base.

5. The pet feeder of claim 1 wherein said liner is shaped so as to permit nested stacking of a plurality of said liners.

6. The pet feeder of claim 1 wherein said liner is comprised of a bowl portion adapted to make close-fitting contact with the interior of said receptacle, and a lip member which surrounds the upper perimeter of said liner and is provided with a lower portion adapted to make close-fitting contact with the exterior sidewall of said receptacle.

7. The pet feeder of claim 6 wherein said lip member is provided with a trough adjacent its lowermost extremity.

* * * * *